United States Patent [19]

McRae et al.

[11] 4,075,088
[45] Feb. 21, 1978

[54] APPARATUS FOR GRADING OBJECTS ACCORDING TO SIZE

[75] Inventors: Douglas Charles McRae, Penicuik; Philip Scott Hutchison, Currie, both of Scotland

[73] Assignee: National Research Development Corporation, London, England

[21] Appl. No.: 694,383

[22] Filed: June 9, 1976

[30] Foreign Application Priority Data

June 13, 1975 United Kingdom ............... 25399/75

[51] Int. Cl.² ............................................. B07C 5/04
[52] U.S. Cl. ................................... 209/106; 209/307
[58] Field of Search ................. 209/97, 106, 107, 307, 209/308, 73

[56] References Cited

U.S. PATENT DOCUMENTS 3,272,334  9/1966  Russell ................................ 209/106
3,277,815  10/1966  Johnson et al. .................. 209/106 X Primary Examiner—Robert B. Reeves
Assistant Examiner—Joseph J. Rolla
Attorney, Agent, or Firm—Oblon, Fisher, Spivak, McClelland & Maier

[57] ABSTRACT

Apparatus for grading objects according to size comprises a grading array of spaced apart grading rollers which allow objects smaller than the roller spacing to pass between adjacent rollers but retain objects larger than the roller spacing. Support members are provided capable of assuming different degrees of curvature, for example endless conveyors, and the grading members are mounted on and spaced from the support members by mounting elements which extend outwardly from the support members. A mechanism for varying the curvature of the support members, such as a leaf spring on which the support members rests, causes the grading rollers to spread apart or to come towards each other so as to vary the size threshold of the grading array.

12 Claims, 6 Drawing Figures

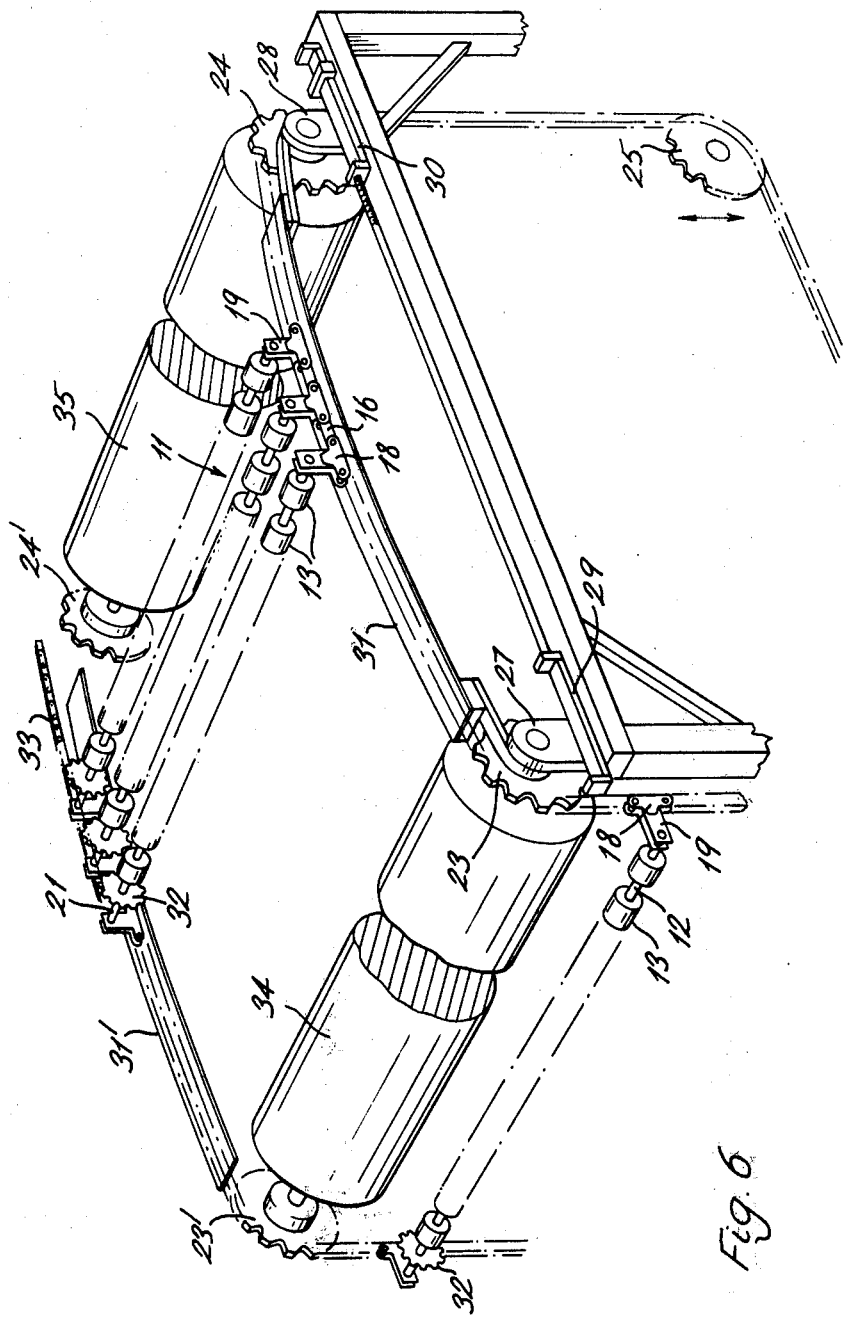

APPARATUS FOR GRADING OBJECTS ACCORDING TO SIZE

The present invention relates to apparatus for grading objects according to size.

It is known to provide apparatus for grading objects according to size in which an array of spaced apart grading rollers forms a bed upon which are deposited the objects to be graded. The objects are spread across the bed of grading rollers, and those objects which are smaller than the spacing between adjacent grading rollers fall between the grading rollers, while objects which are larger than the spacing between adjacent grading rollers are retained. Means are provided for removing the larger objects from the bed, and for supplying further objects to be sorted.

It is also known to mount grading rollers such as have been described on conveyor means so that the bed of grading rollers is continuously translated in the manner of an endless conveyor belt. In such an arrangement the objects to be graded are deposited on the moving bed of grading rollers over a grading area where the smaller objects fall through the bed. The larger objects retained on the bed are then discharged at the end of the conveyor means.

In grading apparatus of the kind described, the size threshold at which the objects are graded is determined by the spacing between adjacent grading rollers.

It is one object of the present invention to provide apparatus for grading objects according to size by spaced apart grading members, in which it is possible to vary the spacing between the grading members so as to vary the size threshold at which the objects are graded.

According to the present invention there is provided apparatus for grading objects according to size comprising a grading array of spaced apart grading members arranged in such a manner as to allow objects smaller than the spacing between adjacent grading members to pass between adjacent members but to retain on the array of grading members objects larger than the spacing between adjacent grading members, and support means capable of assuming different degrees of curvature, the grading members being mounted on and spaced from the support means by mounting elements which extend outwardly from the support means and are such that variation of the curvature of the support means causes the grading members to spread apart or to come towards each other.

The support means may for example comprise a flexible member such as a belt or strip of flexible material, or may comprise a number of rigid elements pivotally coupled together. Where the support means comprises a number of rigid elements coupled together, the term curvature includes an approximately curved configuration formed by stepped variation of inclination of the rigid elements.

The grading members are preferably elongated members which, over the extent of the grading array, are evenly spaced apart and parallel to one another. The grading members may be in the form of plain uniform cylinders or may be elongated members contoured along the length thereof. Preferably the grading members comprise grading rollers mounted to allow rotation about the axes thereof. Such rollers may rotate freely or there may be provided means for driving the rollers in rotation.

Preferably the support means comprise conveyor means for conveying the grading members in a movement at right angles to the longitudinal axes of the grading members. Preferably the conveyor means comprises an endless conveyor means having an upper traverse and a lower, return, traverse, the said grading array being composed of grading members which at any one time are positioned in the upper traverse of the conveyor means.

The mounting elements may comprise outstanding lugs mounted on the elongated support means. The mounting elements may be discrete elements mounted on the support means or may be integral with elements forming part of the support means. The mounting elements may extend upwardly from the support means supporting the grading members above the support means, or alternatively the mounting elements may extend downwardly with the grading members depending from the support means.

Conveniently the support means may comprise two elongated parallel support means and the grading members may span the space between the two support means. The support means may comprise two endless conveyor means trained about common axles and supporting the grading members at the ends thereof.

The apparatus may include means for varying the curvature of the support means comprising guide means of variable curvature against which the support means rests. Where the support means comprises a conveyor means, the conveyor means may be arranged to slide or otherwise travel across the guide means.

In one arrangement the apparatus may include means for varying the curvature of the elongated support means comprising a leaf spring the curvature of which can be varied by contracting or relaxing tension means coupling together the ends of the leaf spring.

Embodiments of the invention will now be described by way of example with reference to the accompanying drawings in which:

FIG. 6 is a diagrammatic perspective view showing the general arrangement of the apparatus shown in the preceding Figures.

Figure 1:
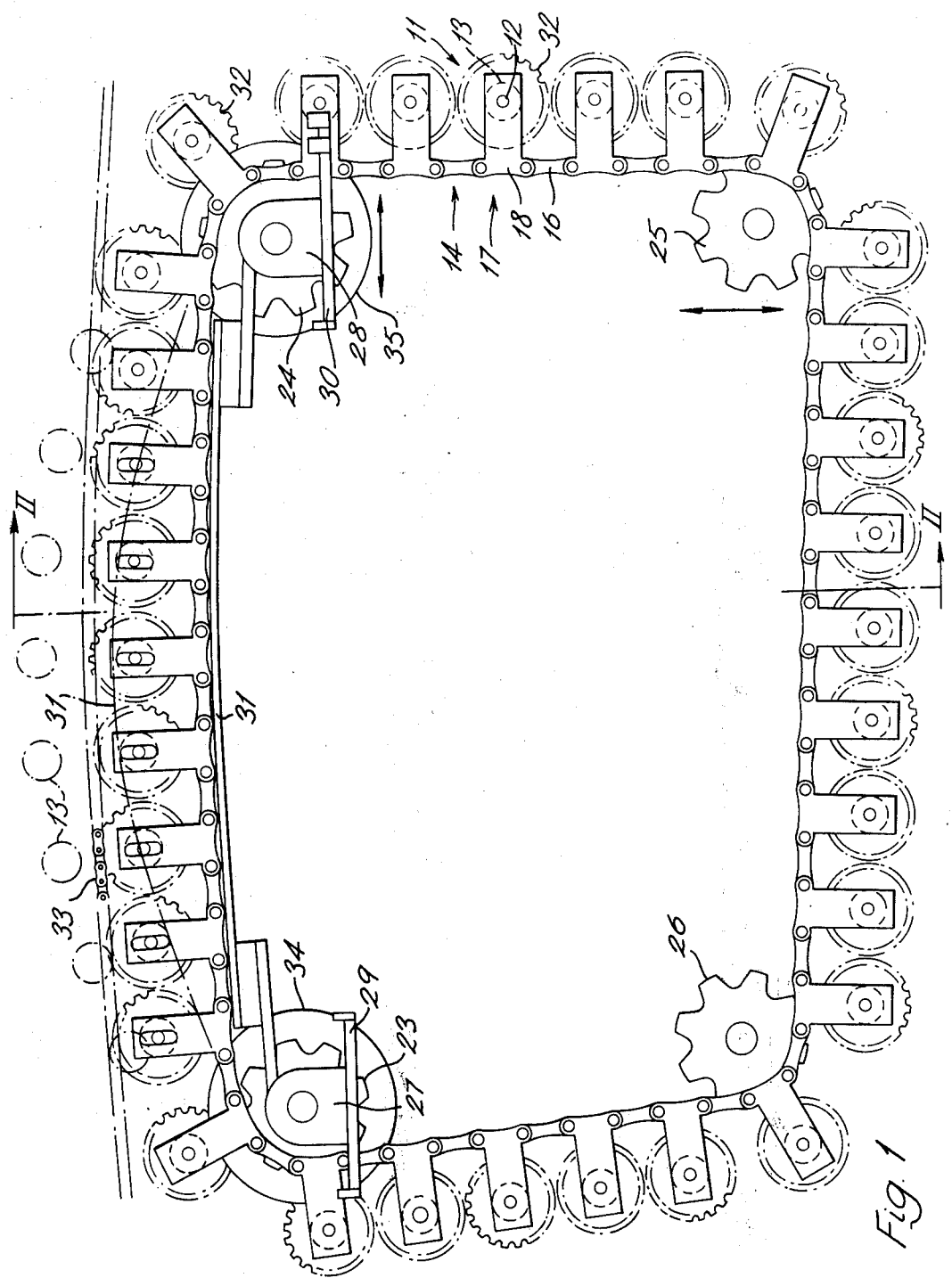
FIG. 1 is a side view of the main components of apparatus embodying the invention for grading objects according to size.
Figure 2:
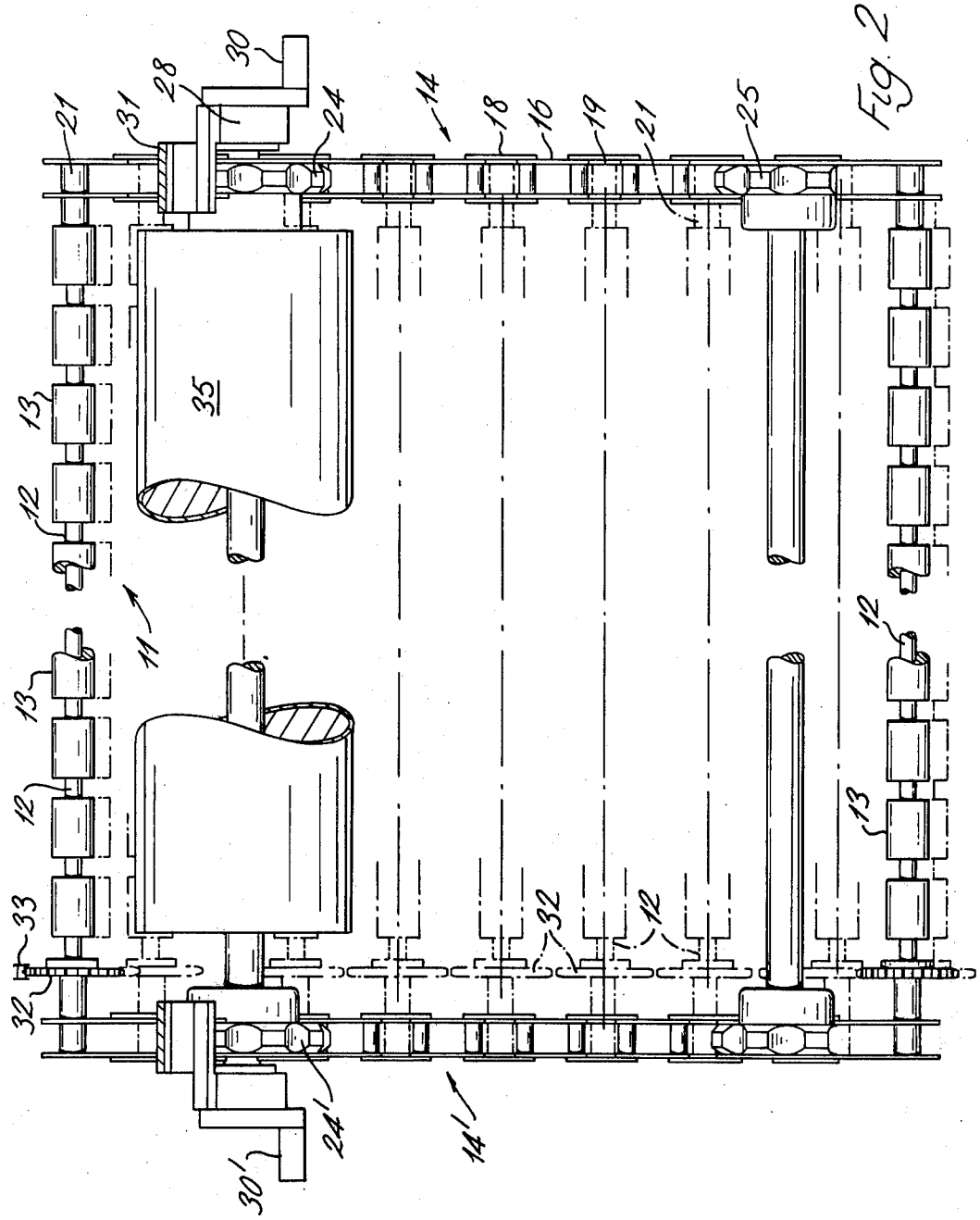
FIG. 2 is a section along the lines II — II in FIG. 1.
Figure 3:
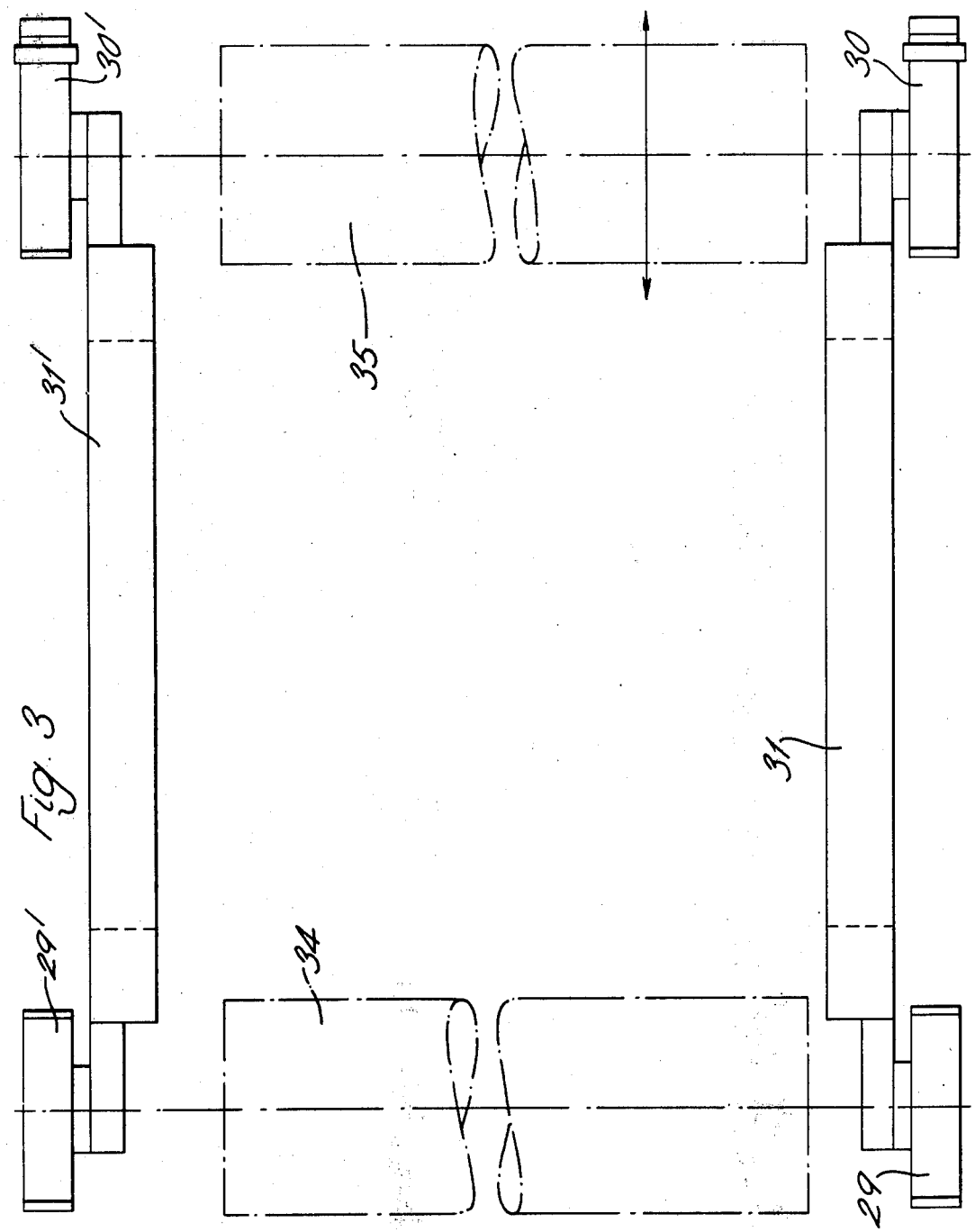
FIG. 3 is a plan view showing the general arrangement of the components shown in FIG. 1.

Referring to the Figures, apparatus embodying the invention for grading objects according to size, for example potatoes, onions or other produce, comprises a grading array of spaced apart grading members constituted by grading rollers indicated generally at 11. Each roller 11 comprises a central roller axle 12 on which are supported a plurality of rubber rollers elements 13 of right circular cylindrical shape mounted coaxial with the axle 12. The rubber elements 13 are spaced axially across the array of rollers 11 leaving small gaps of between $\frac{1}{2}$ and $\frac{1}{3}$ of the width of each roller element 13. The effect of the roller elements 13 mounted on each axle 12 is to give a grading roller 11 of contoured profile such as to spread out the objects to be separated across the bed formed by the array of grading rollers 11.

Each grading roller 11 is mounted to span the space between two parallel, elongated support means constituted by conveyor means indicated generally at 14 and 14'. For simplicity, only the conveyor means 14 will be described in detail together with its associated drive and support means; the corresponding conveyor means 14' and associated elements are in general of identical construction and arrangement. In some places elements associated with the conveyor means 14', and corresponding to elements described in association with the conveyor means 14, are indicated by corresponding dashed reference numerals. Each of the conveyor means 14 and 14' consists of an endless chain composed of two forms of links 16 and 17. The links 16 comprise simple links pivotally jointed at each end to adjacent links 17. Each link 17 comprises a base portion 18 corresponding to the simple link 16, and an outstanding lug 19 which supports one of the grading rollers 11.

Figure 4:
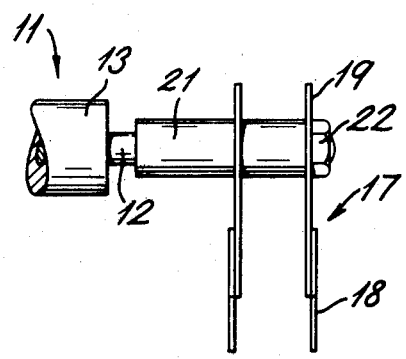
FIGS. 4 and 5 show end and side views respectively of one link in a conveyor means shown in FIG. 1.
Figure 5:
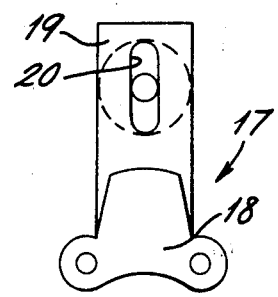

FIGS. 4 and 5 show in detail the construction of one of the links 17. The outstanding lug 19 is welded to the base portion 18, and has a slot 20 in which is housed an end mounting 21 of one of the grading rollers 11. The end mounting 21 includes a nut 22 to allow adjustment of the spacing of the end mounting 20 from the base portion 18 by movement of the end mounting 21 in the slot 20.

The conveyor means 14 is an endless conveyor means trained around four spaced apart sprockets 23 to 26. The upper sprockets 23 and 24 are journalled in bearing mountings 27 and 28 mounted respectively on sub-frames 29 and 30 which in turn are mounted on a main frame not shown. The sub-frame 29 mounts the bearing mounting 27 fixedly on the main frame, but the sub-frame 30 allows horizontal adjustment of the bearing mounting 28 relative to the main frame.

The bearing mountings 27 and 28 are coupled to a leaf spring 31 which provides a guide means on which rest the links 16 and 17 of the conveyor means 14. The adjustable bearing mounting 28 is provided with a screw thread adjustment (not shown) coupling the bearing mounting 28 to the sub-frame 30 and allowing movement of the bearing mounting 28 horizontally along the sub-frame 30 by release or tightening of the screw thread adjustment. The result of the movement of the adjustable bearing mounting 28 along the sub-frame 30 is to increase or decrease the curvature of the leaf spring 31 which in turn varies the curvature of the conveyor means 14. In FIG. 1 the position of least curvature of the leaf spring 31 is shown in full line, and the position of greatest curvature of the leaf spring 31 is shown in dotted line.

The principle of operation of the invention is that when the curvature of the leaf spring 31 is increased and the curvature of the conveyor means 14 is correspondingly increased, the outstanding lugs 19 which support the rollers 11 are forced to assume an outwardly diverging configuration relative to one another. This mutual inclination of the lugs 19 produces a spreading apart of the grading rollers 11. Furthermore, the greater the curvature of the leaf spring 31, the greater the inclination of each lug 19 to its neighbour, and the greater the spacing between the grading rollers 11. Correspondingly, a decrease in the curvature of the leaf spring 31 causes the grading rollers 11 to come together as the inclination of each lug 19 to its neighbour decreases. In the embodiment shown, the minimum spacing of the grading rollers 11 is produced when the leaf spring 31 is straight and each lug 19 is parallel to its neighbour. However it will be appreciated that embodiments can be constructed in which the curvature of the conveyor means 14 can be varied from the convex position shown in dotted line in FIG. 1, through the straight position, towards an inwardly concave position which produces an even smaller spacing between the rollers 11. Such a modification may require additional guide means, such as a further leaf spring, positioned above the links 16 and 17 so as to guide the rollers 11 downwardly along the required curve.

In order to accommodate the change in tension in the conveyor means 14 produced by varying the curvature of the leaf spring 31, the sprocket 25 is also mounted in an adjustable bearing mounting (not shown) which allows a vertical adjustment to be made in association with variation of the bearing mounting 28. For example the automatic adjustment of the sprocket 25 may be made by means of movement against a positioning spring.

As an additional advantageous feature of the embodiment shown in FIG. 1, which is however not essential, each grading roller 11 may carry on its roller axle 12 a further sprocket 32 fixedly secured to the shaft 12. As each grading roller 11 passes over the leading drive sprocket 23, the further sprocket 32 meshes with a stationary chain 33 mounted above the bed of rollers 11. In the embodiment shown in FIG. 1, the main driving sprockets 23 to 26 rotate in a clockwise direction so that the conveyor means 14 is carried around in a clockwise sense. The movement of the rollers 11 across the bed (from left to right in FIG. 1), driven by the conveyor means 14 and 14', produces a rotation of the rollers 11 in an anti-clockwise direction by the meshing of the sprocket 32 with the stationary chain 33. This individual rotation of the grading rollers 11 as they move across the grading bed produces an improved grading of long objects by rotating and agitating the objects until they present themselves in the correct position relative to the spacing between the rollers 11.

There are also mounted on the axes of the sprockets 23 and 24, two uniform steel rollers 34 and 35 respectively, having radii greater than the sprockets 23 and 24 by an amount such that the rollers 34 and 35 provide a barrier beneath the grading rollers 11 while these are passing over the sprockets 23 and 24. As can be seen from FIG. 1, the passage of the grading rollers 11 over the sprockets 23 and 24 produces an increase in the spacing between the grading rollers 11, and the purpose of the rollers 34 and 35 is to prevent objects from falling between the grading rollers 11 when the grading rollers are passing over the sprockets 23 and 24. This avoids objects becoming trapped when the spacing resumes its normal value, and also prevents spurious grading of objects. For grading carrots, parsnips or other tapered or elongated objects, the trailing steel roller 34 can be omitted and these objects may then fall through to a suitably placed conveyor as the gap between the rollers increases on the short curve formed by the chain passing round the sprockets. Suitable baffles may be placed to segregate material falling through at this point from smaller objects sized nearer the entry point to the conveyor.

The overall operation of the apparatus is as follows. The objects to be graded are deposited on the bed of grading rollers 11 between the sprockets 23 and 24, and are transported from left to right in FIG. 1. As they are transported, the smaller objects fall between the spaces between the grading rollers 11 and are guided to a first discharge area. The larger objects are retained on the bed of grading rollers 11 and are transported across the bed and are discharged to a second discharge area as the rollers 11 pass over the sprocket 23. When it is desired to vary the threshold size at which objects fall between the grading rollers 11, the curvature of the leaf spring 31 is varied to produce a spreading or coming together of the rollers 11 so as to increase or decrease the inter-roller spacing.

By way of example of the dimensions which may be used in the embodiment of FIG. 1, for example for grading potatoes, the spacing between the conveyor means 14 and 15 may be 2 feet. Each grading roller may have a diameter of 1¼ inches across the roller element 13 and ½ inch across the roller axle 12. The maximum distance between the axles of the sprockets 23 and 24 may be approximately 28 inches, corresponding to the straight position of the leaf spring 31. Referring to FIGS. 4 and 5, the spacing between the axis of the roller 11 and the pivot axis of the link 17 at the base portion 18 may vary between 3¾ inches and 5½ inches. The width of each link 17 and 18 between the pivot points of the links may be 3 inches.

For a setting of the distance between the axis of a roller 11 and the pivot axis of its corresponding link 17 of 2½ inches, a variation in curvature of the leaf spring 31 between the straight position and the curved position shown in FIG. 1 may produce a variation in the gaps between the rollers 11 of 0.25 inch. Such a range of curvature as is shown in FIG. 1 corresponds to a maximum change of height of the leaf spring 31 at its centre of approximately 2½ inches for a maximum separation of the axes of the sprockets 23 and 24 of approximately 28 inches. As an alternative example, where the lug height from the axle of a grading roller 11 to the pivot axis of the corresponding link 17 is 5 inches, the maximum variation in roller spacing could be made to be ½ inch.

In a modification of the invention (not shown) adjustment of the spacing between grading rollers can be made to be automatically adjusted in response to some sensed parameter of the object mixture being graded. This adjustment when running can conveniently be made automatic by connecting the bearing mountings 28 and 28' to a small hydraulic or pneumatic ram controlled by a parameter sensor.

We claim:
1. Apparatus for grading objects according to size, which comprises:
   a plurality of spaced apart grading members forming a grading array for grading objects by allowing objects smaller than the spacing between adjacent grading members to pass between adjacent grading members while retaining on the grading members objects larger than the spacing between adjacent grading members;
   support means for the grading members, said support means comprising elongated base means capable of assuming different degrees of curvature along its length, and mounting elements for mounting said grading members on said elongated base means; and
   means for selectively varying the curvature of said elongated base means for giving a degree of curvature selectable from a range of different curvatures;
   said mounting elements being secured on said elongated base means at spaced intervals along the length of the elongated base means, said spaced intervals remaining constant during operation of the apparatus, and said grading members being mounted on outstanding portions of said mounting elements at positions spaced from said elongated base means in directions normal to the length of the elongated base means, whereby variation of the curvature of said elongated base means causes said outstanding portions of said mounting elements to fan out or to close up so that said grading members spread apart or come towards each other in order to selectively vary the grading spacing between adjacent grading members.

2. Apparatus according to claim 1 in which said elongated base means comprises two elongated parallel spaced apart base means and the grading members span the space between the two base means.

3. Apparatus according to claim 1 in which said means for selectively varying the curvature of said elongated base means comprises a leaf spring and variable tension means coupling together the ends of the leaf spring for varying the curvature of the leaf spring by contracting or releasing the tension means.

4. Apparatus according to claim 1 in which the grading members comprise elongated members which are generally parallel to one another and which extend generally at right angles to the length of said elongated base means.

5. Apparatus according to claim 1 in which any selected curvature of said elongated base means is arranged to be a constant degree of curvature along the length of the grading array whereby the grading spacing between adjacent grading members is constant over the grading array for any given selected curvature of the elongated base means.

6. Apparatus according to claim 1 in which the grading members comprise grading rollers mounted for rotation about the axes thereof.

7. Apparatus according to claim 6 including means for driving the rollers in rotation.

8. Apparatus according to claim 7 in which sprocket means are provided on said grading rollers; and,
   said means for driving the rollers in rotation comprises a stationary chain whereby said sprocket means mesh with said stationary chain during grading operation.

9. Apparatus according to claim 1 in which said elongated base means comprises endless conveyor means for conveying the grading members in a movement in a direction generally along said length of the elongated base means.

10. Apparatus according to claim 9 in which said means for selectively varying the curvature of said elongated base means comprises guide means for guiding said elongated base means along a predetermined path and means for varying the configuration of said guide means to vary the curvature of said predetermined path.

11. Apparatus according to claim 9 in which the conveyor means comprises endless conveyor means having an upper traverse and a lower return traverse, the said grading array being composed of grading members which at any one time are positioned in the upper traverse of the conveyor means.

12. Apparatus for grading objects according to size, which comprises:
   a plurality of spaced apart grading members forming a grading array for grading objects by allowing objects smaller than the spacing between adjacent grading members to pass between adjacent grading members while retaining on the grading members objects larger than the spacing between adjacent grading members;

support means for the grading members, wherein said support means comprises first and second endless conveyor means capable of assuming different degrees of curvature along the length thereof, and mounting elements for mounting said grading members on said endless conveyor means, said first and second endless conveyor means being spaced apart in a direction perpendicular to the length of the conveyor means, and said grading members being mounted to span the space between said first and second endless conveyor means;

first and second guide means for guiding respectively said first and second endless conveyor means along predetermined paths of selectively variable curvature; and means for varying the configuration of the guide means for varying the curvature of said predetermined paths of said conveyor means;

said mounting elements being secured on said endless conveyor means at spaced intervals along the length of said endless conveyor means, said spaced intervals remaining constant during operation of the apparatus, and said grading members being mounted on outstanding portions of said mounting elements at positions spaced from said endless conveyor means in directions normal to the length of said endless conveyor means, whereby variation of the curvature of said predetermined paths of said endless conveyor means causes said outstanding portions of said mounting elements to fan out or to close up so that said grading members spread apart or come towards each other in order to vary the grading spacing between adjacent grading members.

* * * * *